(12) United States Patent
Hirt et al.

(10) Patent No.: US 8,750,710 B1
(45) Date of Patent: Jun. 10, 2014

(54) SYSTEM AND METHOD FOR FACILITATING FIBER ACCESS TRANSPORT USING PLUGGABLE RADIO FREQUENCY OPTICS

(75) Inventors: Fred S. Hirt, LaPorte, IN (US); Fernando X. Villarruel, Romeoville, IL (US); Kuang-Yi Wu, Bolingbrook, IL (US)

(73) Assignee: Cisco Technology, Inc., San Jose, CA (US)

( * ) Notice: Subject to any disclaimer, the term of this patent is extended or adjusted under 35 U.S.C. 154(b) by 402 days.

(21) Appl. No.: 13/184,302

(22) Filed: Jul. 15, 2011

(51) Int. Cl.
*H04B 10/40* (2013.01)

(52) U.S. Cl.
USPC ............................................. 398/135; 398/9

(58) Field of Classification Search
USPC ...................................................... 398/9, 135
See application file for complete search history.

(56) References Cited

U.S. PATENT DOCUMENTS

| | | | | |
|---|---|---|---|---|
| 2007/0223920 | A1* | 9/2007 | Moore et al. | 398/38 |
| 2008/0101801 | A1* | 5/2008 | Khalouf et al. | 398/193 |
| 2009/0154872 | A1* | 6/2009 | Sherrer et al. | 385/14 |

OTHER PUBLICATIONS

U.S. Appl. No. 13/335,729, entitled "System and Method for Monitoring Two-Wire Communication in a Network Environment," filed Dec. 22, 2011, Inventors: Harold E. Bamford, et al.
Cisco, "Cisco CRS Carrier Routing System: Ethernet Physical Layer Interface Module Installation Note," © 2010; 74 pages; http://www.cisco.com/en/US/docs/routers/crs/crs1/plim/installation/guide/eth6437.pdf.
Cisco, "Implementing Nexus 7000 in the Data Center Aggregation Layer with Services," © 2008; 46 pages; http://www.cisco.com/en/US/docs/solutions/Enterprise/Data_Center/nx_7000_dc.pdf.
Cisco, "Virtual Machine Mobility with Vmware VMotion and Cisco Data Center Interconnect Technologies," © 2009; 17 pages; http://www.cisco.com/en/US/solutions/collateral/ns340/ns517/ns224/ns836/white_paper_c11-557822.pdf.
Villarruel, Fernando, "HFC Optical Architectures Primer," Cisco, Jul. 28, 2010; 56 pages.
Fernando Villarruel, et al., "Pluggable RF Optics," Jun. 10, 2011, 2011 Spring Technical Forum, Cisco; 8 pages.
Fernando Villarruel, et al., "Pluggable Optics for HFC," Jun. 29, 2011, Cisco; 11 pages.
Cisco Data Sheet, "Cisco ONS Pluggable Optics Series Modules for the Carrier Packet Transport (CPT) Platform," © 2011 Cisco; 15 pages.
David Piehler, "Next-generation Components for Optical Access Networks," OSA/OFC/NFOEC 2011; 3 pages.
Cisco White Paper, "Digital Transmission: Carrier-to-Noise Ratio, Signal-to-Noise Ratio, and Modulation Error Ratio," © 1992-2006 Broadcom Corporation and Cisco Systems, Inc.; 42 pages.
Cisco White Paper, "Wideband: Delivering the Connected Life," © 1992-2006 Broadcom Corporation and Cisco Systems, Inc.; 7 pages.

(Continued)

*Primary Examiner* — Leslie Pascal
(74) *Attorney, Agent, or Firm* — Patent Capital Group

(57) ABSTRACT

An example method includes receiving radio frequency (RF) signals from a cable modem termination system (CMTS) in a small form factor pluggable optical transmitter; converting the RF signals to optical signals in the small form factor pluggable optical transmitter; and transmitting, by the small form factor pluggable optical transmitter, the optical signals on a network. More specific embodiments can include RF signals that are modulated, where a modulation error ratio (MER) of the RF signal varies substantially linearly with Carrier to Composite Noise (CCN), and the converting is implemented by a laser transmitter. Other, more specific, embodiments include routing the RF signals through a pre-distortion RF amplifier RF variable attenuator, and coupling the optical transmitter to a chassis of the CMTS.

29 Claims, 12 Drawing Sheets

(56) References Cited

OTHER PUBLICATIONS

Cisco, "Chapter 1: Data Center High Availability Clusters," *Data Center High Availability Clusters Design Guide*, © 2006 Cisco Systems Inc.; 24 pages; http://www.cisco.com/en/US/docs/solutions/Enterprise/Data_Center/HA_Clusters/HAOver_1.pdf.

Cisco, "Chapter 3: Server Cluster Designs With Ethernet," *Cisco Data Center Infrastructure 2.5 Design Guide*, Dec. 6, 2007; 14 pages; http://www.cisco.com/en/US/docs/solutions/Enterprise/Data_Center/DC_Infra2_5/DCInfra_3.pdf.

Cisco, "Chapter 14: Configuring Cisco Express Forwarding," *Cisco Catalyst 4000 Family Switch Cisco IOS Software Configuration Guide Release 12.1(8a)EW;* 10 pages; [retrieved and printed Feb. 27, 2013] http://www.cisco.com/en/US/docs/switches/lan/catalyst4500/12.1/8aew/configuration/guide/cef.pdf.

International Telecommunication Union, "Series J: Cable Networks and Transmission of Television, Sound Programme and Other Multimedia Signals—Digital transmission of television signals," J.83, Dec. 2007; 66 pages.

Maxim Integrated Products, "Optical Microcontroller," DS4830, 19-5934; Rev. 1; Oct. 2011; 29 pages; http://datasheets.maxim-ic.com/en/ds/DS4830.pdf.

Maxim Integrated Products, "XFP Laser Control and Digital Diagnostic IC," DS1862, © 2007; 43 pages; http://datasheets.maxim-ic.com/en/ds/DS1862.pdf.

SFF Committee, "INF-8077i—10 Gigabit Small Form Factor Pluggable Module," Revision 4.5, Aug. 31, 2005; 192 pages; ftp://ftp.seagate.com/pub/sff/INF-8077.PDF.

Texas Instruments, "Dual Buffer/Driver With Open-Drain Outputs," SN74LVC2G07, © 2001-2008; 16 pages; http://www.ti.com/lit/ds/symlink/sn74lvc2g07.pdf.

Texas Instruments, "Low-Power Dual Digital Isolators," ISO7420, ISO7420M, ISO7421; 22 pages; http://www.ti.com/lit/ds/symlink/iso7421.pdf.

VMware VMotion, "Live Migration for Virtual Machines Without Service Interruption," Product Datasheet, © 2009; 2 pages; http://www.vmware.com/files/pdf/VMware-VMotion-DS-EN.pdf.

\* cited by examiner

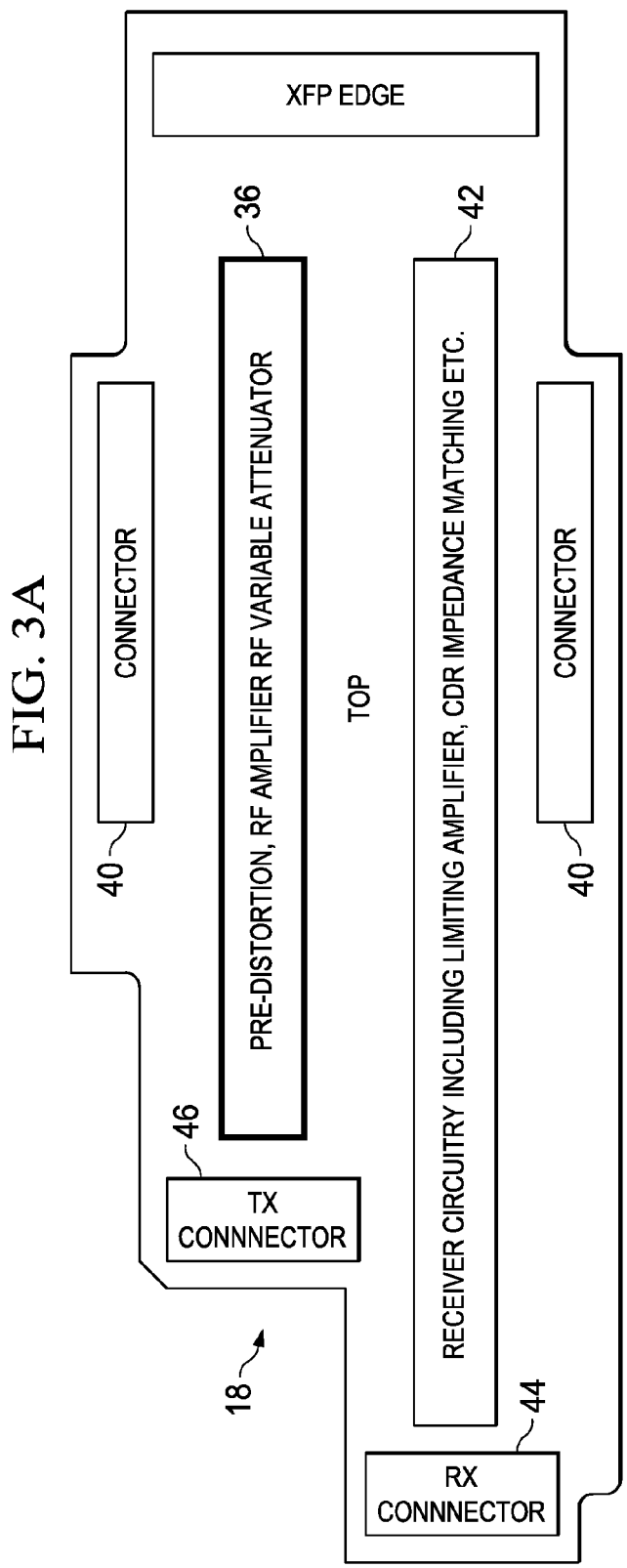

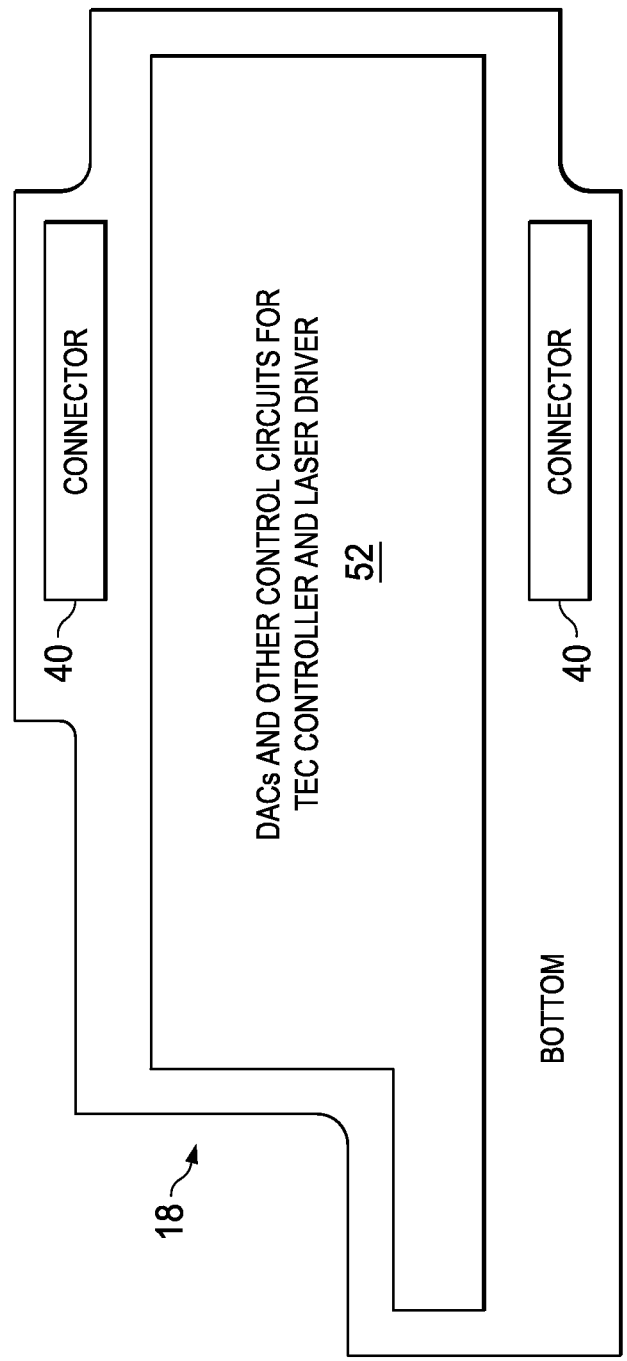

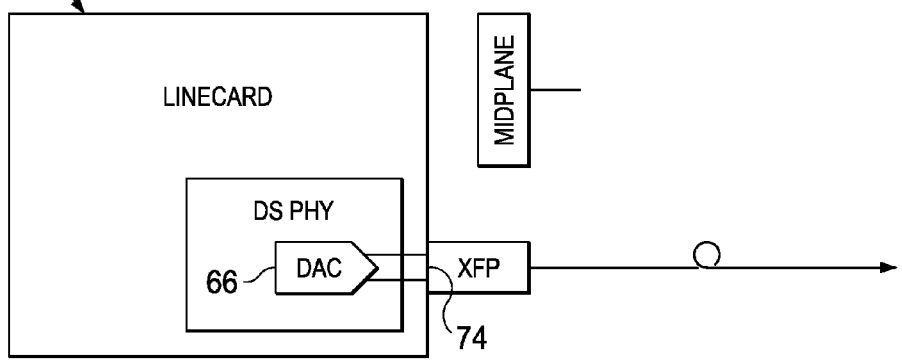
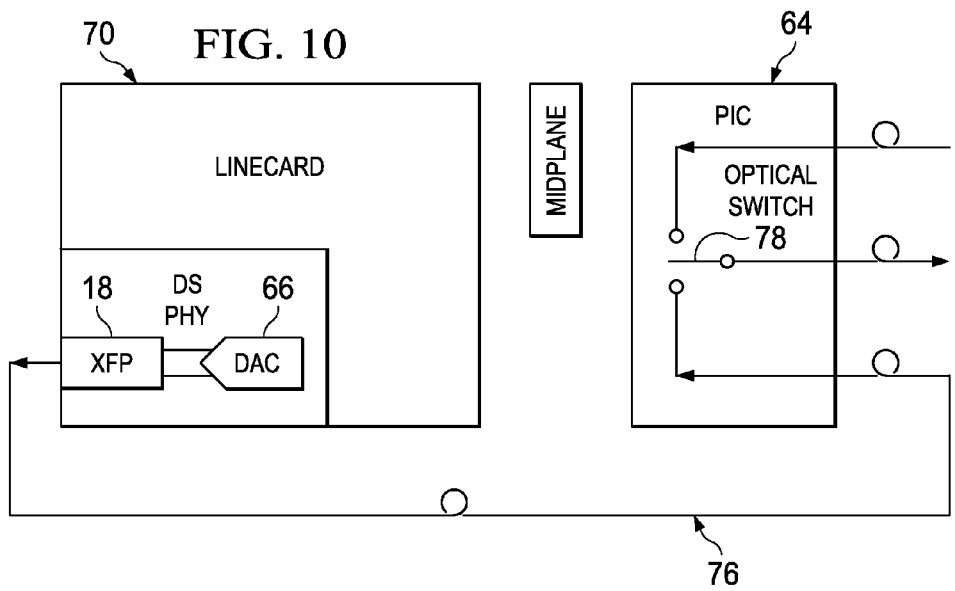

FIG. 13
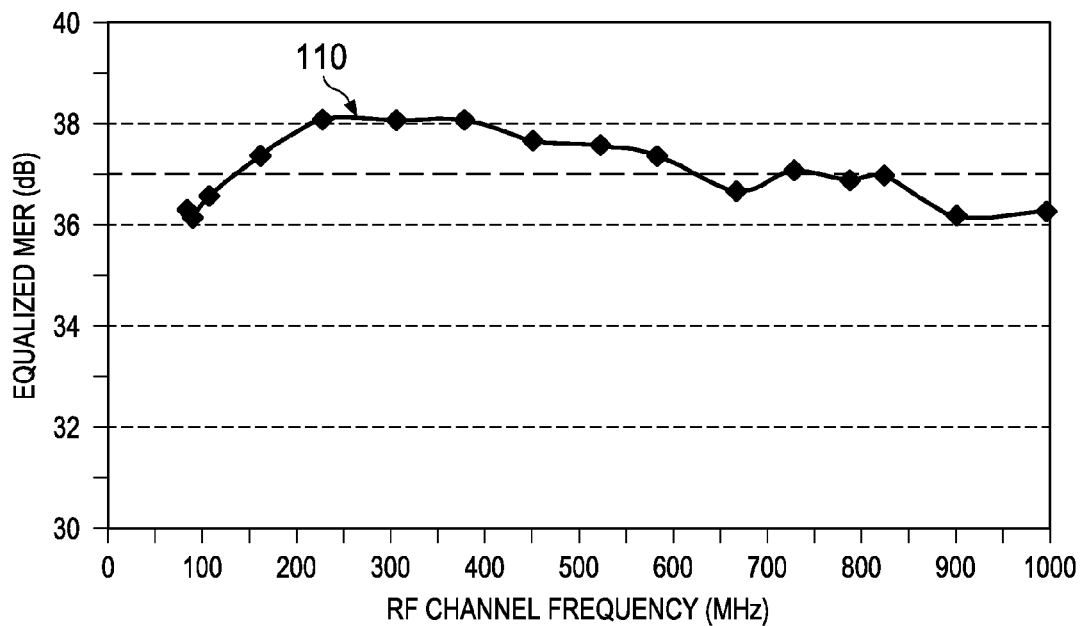
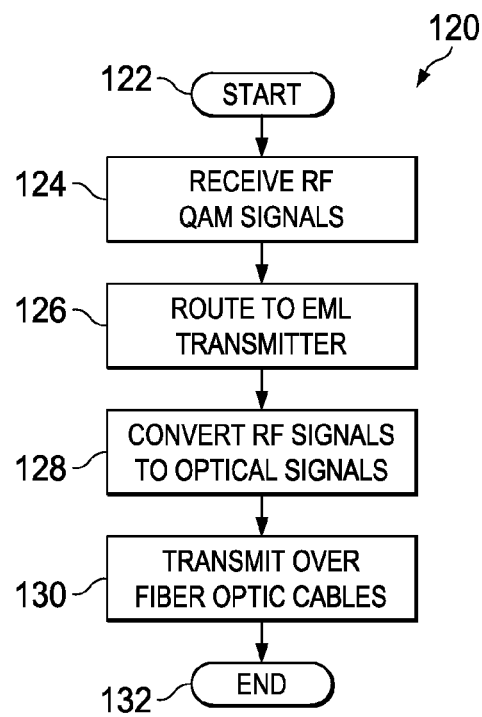
FIG. 14

SYSTEM AND METHOD FOR FACILITATING FIBER ACCESS TRANSPORT USING PLUGGABLE RADIO FREQUENCY OPTICS

TECHNICAL FIELD

This disclosure relates in general to the field of electronic communications and, more particularly, to a system and a method for facilitating fiber access transport using pluggable radio frequency (RF) optics.

BACKGROUND

Most of today's cable transport systems are straining to handle an increasing volume of Internet traffic and an expanding array of video services. For example, internet protocol (IP) video is consuming cable bandwidth and it is expected to grow exponentially. Subscribers are increasingly demanding "many services to many screens." Essentially, modern users desire the convenience of having services available anytime, anywhere, and on any device. To address these market requirements, cable companies are transitioning their cable systems to all-digital delivery: requiring flexible management of an expanding array of converging services at low cost.

As cable headends converge, new technology advances in cable television (CATV) headend access optics drive a need to: (1) improve off-line power efficiency; (2) reduce space requirements due to limited space and limited heating, ventilation and air conditioning (HVAC) capacity; (3) improve monitoring and control to provide a unified customer interface; and (4) reduce cost. Further, to deliver many services to many screens, cable operators are seeking an innovative, converged infrastructure that enables the delivery of current services more efficiently, while also providing the means to deliver tomorrow's new, application-intensive residential and commercial services. Deploying solutions that provide enhanced network intelligence, integration, and overall flexibility can not only provide cable operators with short-term relief, but also ultimately enable them to combat competitive pressures and address new market opportunities.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3A is a simplified block diagram of additional details of an example configuration of communication system in accordance with the present disclosure;

FIG. 4B is a simplified block diagram illustrating another view of the further additional details of an example configuration of communication system in accordance with the present disclosure;

FIG. 9 is a simplified block diagram showing yet another example configuration associated with example embodiments;

FIG. 10 is a simplified block diagram showing yet another example configuration associated with example embodiments;

FIG. 13 is a graph showing modulation error ratio as a function of radio channel frequency;

FIG. 14 is a simplified flowchart showing example operational activities associated with embodiments of the present disclosure;

DETAILED DESCRIPTION OF EXAMPLE EMBODIMENTS OVERVIEW

An example method includes receiving radio frequency (RF) signals from a cable modem termination system (CMTS) in a small form factor pluggable optical transmitter; converting the RF signals to optical signals in the small form factor pluggable optical transmitter; and transmitting, by the small form factor pluggable optical transmitter, the optical signals on a network. More specific embodiments can include RF signals that are modulated. This may include a "full-spectrum" channel loading (e.g., 160 channels) of Quadrature Amplitude Modulated (QAM) RF content spanning a range of frequencies, for example 45 to 1003 MHz.

According to an embodiment of the present disclosure, use of QAM modulation throughout the full spectrum channel loading may result in a modulation error ratio (MER) of the RF QAM signal varying substantially (i.e., approximately) linearly with Carrier to Composite Noise (CCN). In an example embodiment, the converting is implemented by an externally modulated laser (EML) transmitter or a directly modulated laser transmitter. Other specific embodiments include routing the RF signals through a pre-distortion RF amplifier RF variable attenuator, and plugging the optical transmitter into a chassis of the CMTS and other features.

EXAMPLE EMBODIMENTS

Figure 1:
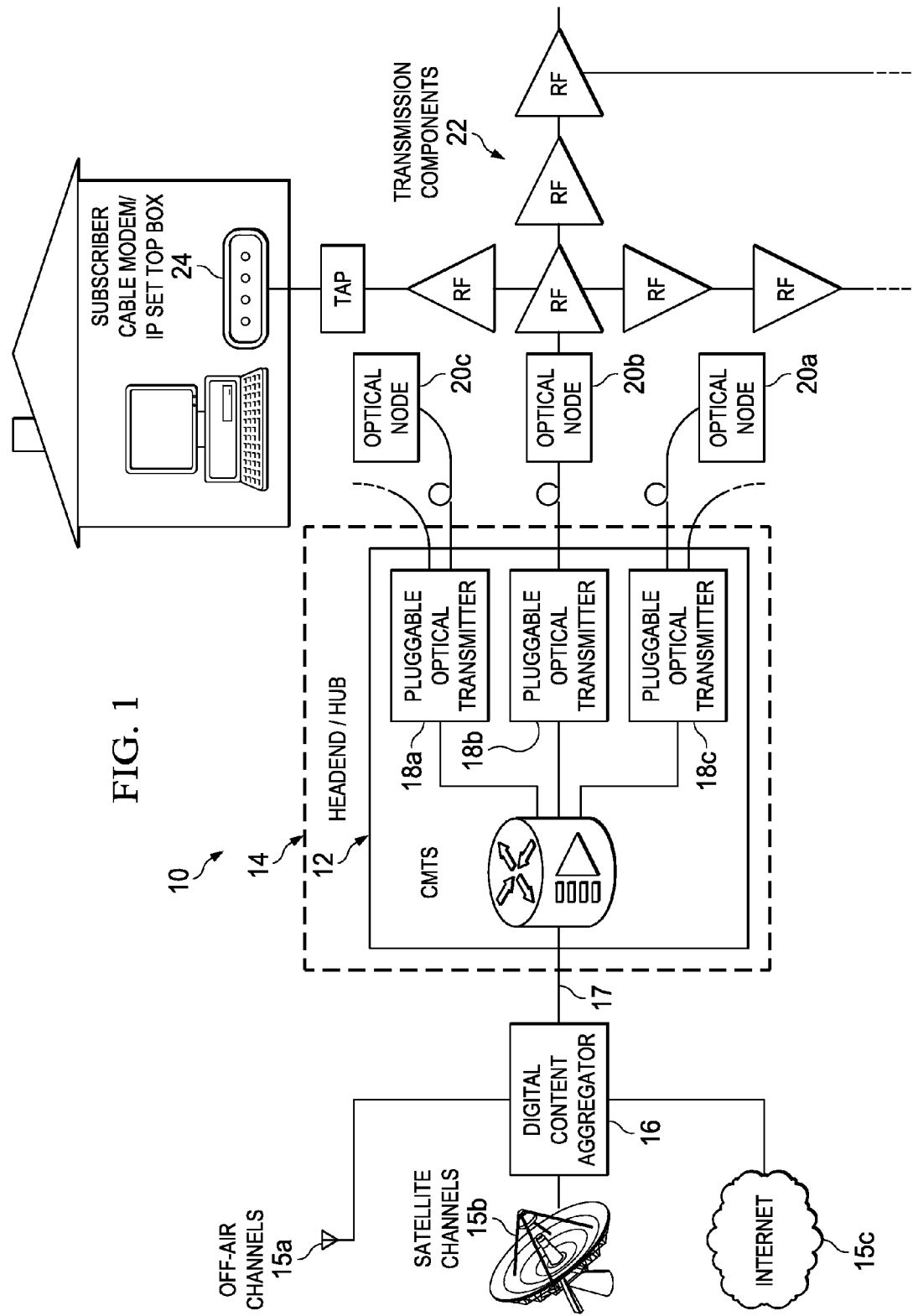
FIG. 1 is a simplified diagram of one embodiment of a communication system in accordance with the present disclosure.

Turning to FIG. 1, FIG. 1 is a simplified block diagram of a communication system 10 for facilitating fiber access transport using pluggable radio frequency optics. A cable modem termination system (CMTS) 12 may be located at a cable company's headend or a hub site 14. A headend is a master facility for distributing data and video programming signals from various sources 15, including off-air channels 15a, satellite 15b, and Internet 15c, for processing and distributing over communication system 10. The data and video programming signals may be collected into a digital stream by a content aggregator 16, with transmission through a baseband digital link 17 terminating in CMTS 12. The signals may be broadcast from headend 14 through one or more pluggable optical transmitters 18 (e.g., 18a, 18b, and 18c) to optical nodes 20 (e.g., fiber nodes 20a, 20b, and 20c) via fiber optic cables. One or more transmission components 22 (including RF amplifiers, coaxial cables, and taps) may carry the signals to subscriber premises, for example, to a subscriber cable modem/IP set top box 24.

According to embodiments of the present disclosure, pluggable optical transmitters 18 may be implemented on an industry standard XFP or small form factor (SFP) pluggable package. Such elements may be capable of accepting RF inputs modulated according to Quadrature Amplitude Modulation (QAM) techniques (e.g., possessing both amplitude and phase modulation), for example, according to ITU-T J.83 Annex A, Annex B, or Annex C modulation, Digital Audio Video Council (DAVIC), or Digital Video Broadcasting—Cable (DVB-C). RF inputs may include a "full-spectrum" channel loading (e.g., 160 channels) of QAM-modulated RF content spanning a range of frequencies, for example 45 to 1003 MHz. The XFP package (10 Gigabit small form factor pluggable) is a standard for transceivers (e.g., used in high-speed computer network and telecommunication applications that use optical fiber). XFP modules may typically operate at optical wavelengths of 850 nm, 1310 nm, 1550 nm, etc. XFP dimensions can be in the approximate order of: (1) Height: 0.33 inches (8.5 mm); (2) Width: 0.72 inches (18.3 mm); and (3) Depth: 3.1 inches (78 mm). SFP dimensions can be in the approximate order of: (1) Height: 0.33 inches (8.5 mm); (2) Width: 0.53 inches (13.4 mm); and (3) Depth: 2.22 inches (56.5 mm). Packing the contents of a full-spectrum, 160 channel, 256-QAM fiber optic transmitter into an industry-standard multi-source agreement (MSA) compliant package, such as SFP or XFP, may represent a 10× density/size improvement along with a greater than 75% off-line power dissipation improvement. RF circuitry in pluggable optical transmitters 18 may be implemented using dense technologies such as ASICs.

According to embodiments of the present disclosure, pluggable optical transmitters 18 may be plugged into a chassis of CMTS 12. Pluggable optical transmitters 18 may comprise an internally corrected transmitter, containing relevant circuitry and correction elements to provide transmission, or alternatively rely upon external correction as provided by CMTS 12, or by optical elements following pluggable optical transmitters 18. Pluggable optical transmitters 18 may be utilized to provide downstream (DS) transmission (e.g., from headend to subscriber) and, further, may be designed to integrate directly into CMTS 12: providing a full spectrum, 160-channel QAM output, per transmitter, per CMTS port. CMTS 12 may also provide RF signals that have additional channels, and may be modulated according to techniques other than QAM (e.g., orthogonal frequency-division multiplexing-quadrature phase-shift keying (OFDM-QPSK)).

Pluggable optical transmitters 18 of FIG. 1 may effectively avoid the separated optics paradigm with their separate support hardware, monitoring and/or control mechanism and software. For example, additional chassis, shelf, or power supplies may not be necessary when pluggable optical transmitters 18 are employed in communication system 10. Furthermore, substantially all separated communications, status monitoring, control hardware and control software may also be eliminated (or at least minimized), since pluggable optical transmitters 18 may be fully integrated into CMTS 12 and may also be controlled by (and report back through) CMTS 12. In an example embodiment, optics appropriately integrated into CMTS ports can allow baseband digital return path opportunities without a remapping of the RF spectrum at headend 14.

Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs. Communication system 10 may also operate in conjunction with, or as part of, a video over IP delivery network or other suitable protocol, for retransmission of video programming or services.

For purposes of illustrating certain example techniques of communication system 10, it is important to understand the communications that may be traversing the network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Cable operators are actively creating roadmaps toward end-to-end all-Internet protocol (IP) service functionality. Simultaneously, recent technical developments have resulted in various schemes for access delivery via IP video to complement the existing Data over Cable Service Interface Specification (DOCSIS). Yet, while there is agreement on IP video delivery as a goal for access transport, there is no broad agreement on the specifics of the access plant hardware required to accommodate IP video delivery without discarding major portions of existing hybrid fiber coaxial (HFC) network. In particular, a desired part of any service transition (e.g., to complete digital transmission) can include technology advances that allow an increase in capacity and performance, while preserving as much of the sunken investment for the current network infrastructure.

HFC is a telecommunications industry term for a broadband network that combines optical fiber and coaxial cable. Generally, there are two demarcation points that define HFC access architectures: (1) transition point from baseband digital content transmission to RF modulated transmission (e.g., RF gateway or CMTS); and (2) transition point at which fiber ends and coaxial cable transmission begins (typically, the optical node). HFC architecture can leverage frequency division multiplexing (FDM) via the RF spectrum and, simultaneously, time division multiplexing (TDM) via DOCSIS. The combination of FDM and TDM has allowed HFC to scale from basic services including broadcast analog transmission, to narrowcast video services, high-speed data, and voice over Internet protocol (VoIP) telephony, without any fundamental changes to its methodology of transmission.

In the last few years, capacity of HFC architectures has increased significantly with a migration to large numbers of QAM channels. In QAM, digital ones and zeroes are represented as a sum of two signals that in-phase ("I") and out-of-phase (quadrature or "Q") with a clock. The Q signal is 90 degrees out of phase with the clock. Each clock cycle encodes 6 or 8 bits, and up to 256 combinations are possible. Higher number of combinations may be possible for larger number of bits. A QAM signal at any given clock cycle is described by its amplitude and phase relative to the clock. Various telecommunications standards exist for implementing QAM on RF signals. For example, ITU-T/J.83 Annex B is an International Telecommunications Union standard related to digital multi-program systems for television, sound and data services for cable distribution. In particular, standard ITU-T/J.83B relates to framing structure, channel coding, and channel modulation for a digital multi-service television distribution system that is specific to a cable channel. ITU-T/J.83B specifies QAM standards applicable to cable communication systems in North America.

The capacity of an all-QAM signal lineup can be competitive with that of any other architecture: even fiber-to-the-home (FTTH). Specifically, with a usable data rate of approximately 38 Mbps per 6 MHz bandwidth 256-QAM channel, the RF spectrum in a forward path as a whole can easily utilize an aggregate 6.5 Gbps available downstream bandwidth. Nevertheless, it is not only raw capacity, but also the simultaneous use of spectrum partitioning and timed availability that multiplies HFC's effectiveness in comparison to other TDM- or FDM-only applications.

A conservative future scenario reflects 200 homes sharing a full all-QAM forward path spectrum for an all-IP service offering. In this example, leveraging of multiple bonding groups within the RF spectrum and including bandwidth accommodation for reverse path growth via a mid-split segmentation may allow a competitive transmission rate of 1 Gbps downstream and 100 Mbps upstream (e.g., from subscribers to headend). An IP deployment of this sort can maintain the node transition point and function unchanged. Thus, in part due to the above-mentioned advantages, when evaluating changes in IP architectures (for example, to integrate optical transmitters into a CMTS unit), it is challenging to change the current combination of RF modulation and DOCSIS.

For many years, the ability to make optical transmitters has been determined by a few key factors. In the case of directly modulated transmitters (DMTx), key factors included a minimum linearity and stability that may be dependent on a growth characteristic and a packaging structure, ultimately creating a specific pool of usable lasers and a size threshold for the optical package, probably only relevant to the cable space. While some deviation has come from a typical butterfly "analog" laser package in the last few years, the gains from the deviation have been minimal. In addition, legacy DMTx may use electronic harmonic distortion correction, both for residual Composite Second Order (CSO) and Composite Triple Beat (CTB) from the analog laser and for fiber induced CSO; the extent to which these corrections are utilized also creates a power consumption and size threshold in the electronics used in DMTx. CSO is a result of carriers experiencing a second order non-linearity. CTB is a result of carriers experiencing a third order non-linearity.

In the case of externally modulated transmitters (EMTx), with an inherently low noise capability and a lack of high CSO accumulation over fiber, their size, power draw and price have typically made them unattractive in comparison to DMTx. For an EMTx, a high power continuous wave (CW) laser, an external modulator and a Stimulated Brillouin Scattering (SBS) and multipath interference (MPI) suppression circuitry typically define the size and power consumption. SBS is a nonlinear scattering effect that takes place in fiber when the launch power of a wavelength is approximately greater than 7 dBm. MPI is a linear scattering effect based upon multiple reflections with in an optical fiber due to, for example, Rayleigh scattering, resulting in noise (e.g., iterative, interferometric noise (IIN)).

Typically, cable TV (CATV) optical transmitters are configured in boxes coupled to CMTS using RF cables. Optical transmitter boxes or modules are available in various sizes ranging in the tens to hundreds of millimeters (e.g., 44×483× 360 mm; 44×483×452 mm, etc.). They are not typically sized to be plugged into a CMTS unit directly. On the other hand, in the baseband digital space, there are various MSAs for small form factor transceiver packages that can be plugged into a CMTS unit. For example, XENPAK, XFP, SFP, and small form factor pluggable 10 Gbps (SFP+) are all popular MSAs. MSAs are industry-accepted by producers and users; they have been in place for some time, benefitting from mature components and predictable cost reduction curves. An example of such a usable standard is a 10 Gbps XFP. XFP modules are generally used in digital applications such as 10 Gigabit Ethernet, 10 Gbit/s Fibre Channel, synchronous optical networking (SONET) at OC-192 rates, synchronous optical networking STM-64, 10 Gbit/s Optical Transport Network (OTN) OTU-2, and parallel optics links. Integrating a CATV optical transmitter with 256-QAM (or 64-QAM, or 1024-QAM, etc.) functionality into a small form factor pluggable package such as XFP and SFP is not a trivial proposition.

For example, methods to integrate optical transmission into CMTS would require the CMTS to internally store, and then read back, a series of pre-correction coefficients. The CMTS would then use these coefficients to mathematically calculate correction factors to its internal QAM generators' outputs, uniquely and separately for each port and transmitter, then continuously digitally pre-distort (DPD) the RF QAM modulation's digitally synthesized (DDS) digital to analog converter (DAC) outputs. However, such an approach requires these correction factors to change over link distance, temperature (and perhaps over time as well) in order to track ageing and temperature variations in RF circuitry and any laser used in the package. This can require a control loop back from the pluggable optic, through its microcontroller, and into the digital up-converter (DUC), where variable DPD coefficients should be applied to the continuous stream of data exiting the DUC into the DDS DAC. This burden on the DUC is variable and ill defined, as differing lasers (e.g., 1550 nm, 1310 nm, etc.) can have widely differing orders of correction, including variable correction based upon a length of fiber span used. In addition to being computationally intensive, the approach is burdensome to the CMTS, has compatibility issues across various manufacturers' implementations of DDS in their CMTS, and is not performance-verifiable on a stand-alone basis.

A system for facilitating fiber access transport using pluggable radio frequency optics, outlined by FIG. 1, can resolve many of these issues. By reducing a physical envelope of and power draw for a full-spectrum, 160 channel, 256-QAM fiber optic transmitter's volume by a factor of greater than 10:1, reducing its off-line power consumption by over 75%, and harmonizing its customer interface with industry-accepted, standard CMTS provisioning interface control and monitoring by completely integrating it into the CMTS, components of communication system 10 and in particular, pluggable optical transmitters 18 may meet current and future convergence challenges of cable communication. Pluggable optical transmitters 18 may also support various number of channels (e.g., 153, 200, etc.) and/or QAM modulation (e.g., 64, 1024, etc.) based upon appropriate needs and considerations. Pluggable optical transmitters 18 may also support modulation techniques other than QAM, such as OFDM-QPSK.

Unlike common approaches that require a CMTS line card and optics to manufacture, test, tune, or verify optical performance, internally corrected pluggable optical transmitters 18 may be capable of stand-alone performance to access optical transport specifications, given power and an input signal. For the sake of description, and not as a limitation, a line card may be a modular electronic circuit (e.g., on a printed circuit board) within CMTS 12 that interfaces with telecommunication lines (such as optical fibers) from a backhaul network (e.g., intermediate links between a backbone of a network and small subnetworks at edges of the network), connected to content generation sources and/or the Internet, to connect subscribers served by the access network of CMTS 12.

Thus, embodiments of the present disclosure may implement a full-spectrum, 160-channel, 256-QAM pluggable, RF fiber optic transmitter for fiber access transport based upon industry standard (e.g., MSA) form-factor, power requirements, signaling, control, electrical and optical connector interfaces. Pluggable optical transmitters 18 may be designed to be substantially completely integrated into CMTS 12 for powering, RF signal input, status monitoring, and control. Example embodiments may improve off-line power efficiency by a factor of 4:1, reduce space requirements in headend 14 by a factor of over 10:1, per transmitter, improve monitoring and control by providing a unified customer interface, and reduce cost by eliminating optics chassis (or multiple chassis), power supplies, status monitoring/control hardware (e.g., Intelligent Communications Interface Module or equivalent) and RF combining networks used to feed typical currently available optical transmitters.

In example embodiments, CATV system operators can deploy communication system 10 in their cable communication networks to transmit signals to their customers over their existing HFC networks. Unlike existing transmitter hardware, full-spectrum 160 channel, 256-QAM fiber pluggable optical transmitters 18 may be substantially integrated into CMTS 12, providing an architecture with less power, less rack space used, unified command and control, and lowered costs. Additional accrued benefits include lowered HVAC and powering costs, streamlined operations, sparing, and logistics offered by using small, pluggable optical modules for access optics.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

Turning to the infrastructure of FIG. 1, the example network environment may be configured to include one or more networks in any form capable of transmitting QAM- and QPSK modulated signals, including networks implementing DOCSIS and IP-video based delivery services utilizing ITU-T J.83 QAM modulated signals. In addition, gateways, routers, switches, and any other suitable network elements may be used to facilitate electronic communication between various nodes. A node may be any electronic device, network element, client, server, peer, service, application, or other object capable of sending, receiving, or forwarding information over communications channels in a network. As used herein, the term 'network element' is meant to encompass computers, network appliances, servers, routers, switches, gateways, bridges, loadbalancers, firewalls, processors, modules, or any other suitable device, component, element, or object operable to exchange information in a network environment. Note that the network illustrated in FIG. 1, may include a configuration capable of transmission control protocol/internet protocol (TCP/IP) communications for the transmission and/or reception of packets in the network. The network could also operate in conjunction with a user datagram protocol/IP (UDP/IP) or any other suitable protocol, where appropriate and based on particular needs. It should be noted that the network configurations and interconnections shown and described herein are for illustrative purposes only. FIG. 1 is intended as an example and should not be construed to imply architectural limitations in the present disclosure.

Pluggable optical transmitters 18 may use an MSA compliant XFP form factor module to integrate into CMTS 12. The XFP specification, as currently defined (e.g., by MSA standards), gives a complex RF modulation (CRM) transmitter, such as pluggable optical transmitters 18, an opportunity to use several already existing, industry-standard interface lines for powering, communication, control, and modulation inputs. For example, a differential input signal interface specified for the XFP lends itself well to RF QAM input. Various powering options exist, including 1.8 V (Vcc2), 3.3 V (Vcc3), and 5 V (Vcc5), with nine ground pins specified for excellent RF and DC connectivity. Module control includes industry-standard two-wire serial interface (e.g., serial clock (SCL), and serial data (SDA)), interrupt, module de-select, power-down, module numbering and presence detection. Communication protocols to the pluggable module are called out in the XFP specification, along with allowable direct current (DC) dissipation limits for each power line and for the module as whole.

The functionality of pluggable optical transmitters 18 may be self-contained, allowing for a potential standardization based on interfaces. Performance parameters may not be tied across active components beyond what exists already at an RF level (e.g., DOCSIS Downstream Radio Frequency Interface Specification (DRFI)). Pluggable optical transmitters 18 according to embodiments of the present disclosure may free potential higher layer host platforms from having to carry calibration data for pluggable optics. For example, host platforms may not have to be transmitter-specific, such as being configured exclusively for DMTx, EMTx, 1310 nm, dense wavelength division multiplexing (DWDM), etc.

Pluggable optical transmitters 18 according to example embodiments may have a DC dissipation for a power level 3 device of not more than 3.5 W per module. According to example embodiments, optics can be a part of a "smart box" (e.g., CMTS 12) with high-speed backbone inputs and access optical outputs. Pluggable optical transmitters 18 may be coupled to content generation devices, which synthesize entire channel lineups via direct digital synthesis (DDS). The content generation devices can generate 135 to 160 channels per port for direct transmission to the node. No external processors or aggregators may be used to control pluggable optical transmitters 18 outside the content generation hardware. Such "full-spectrum" port synthesis may create an additional opportunity for a significant power savings within the content generation boxes, on the order of 3-5 watts per port, by reducing the port's output levels generated when attached to a pluggable optical module.

Other advantages may include that the programmable port power can reduce approximately 350 W or greater per 96-downstream signals per port device, by leveraging lower output levels required of an RF XFP directly driven by a content generator's output port. Under tightly integrated control of the content generator, the XFP can also become part of an "agile" channel lineup, allowing sparing, redundancy, and idling of unused functionality to optimize power consumption versus bandwidth requirements. Whether by itself or integrated into the content generator, XFP-based RF pluggable optical transmitters 18 can save between 5 to 12+ watts per port in DC power dissipation. Considering an even optimistic 85% off-the-wall efficiency improvement yields 6 to 15+ watts per port savings.

Use of an all-QAM complex RF modulation payload allows simplified, relaxed design rules in access links to the customer, thereby creating a new means to recapture space, power, and cost by using specification-based pluggable optical transmitters 18. Thus, pluggable optical transmitters 18 move the electrical-to-optical transition from a separate chassis to an integral part of the IP platform, tightening network control, lowering total power requirements, and saving rack space.

In example embodiments, wavelength, power stability, and mean time between failures (MTBF) of pluggable optical transmitters 18 may be no less than currently available DWDM transmitters, for example, Prisma® XD DWDM transmitters. Pluggable optical transmitters 18 may support 8 DWDM channels. In example embodiments, pluggable optical transmitters 18 may support a 1310 nm transmitter. Pluggable optical transmitters 18 may meet or exceed all-QAM MER performance specifications and distance capability (e.g., >40 km) of currently available transmitters, e.g., Prisma® XD SuperQAM Full Spectrum transmitter. In example embodiments, pluggable optical transmitters 18 may have output power greater than or equal to 5 dBm. Primary and protect RF handoff to pluggable optical transmitters 18 may meet DRFI performance. In example embodiments, pluggable optical transmitter 18 may be designed as a linear QAM RF transmitter without substantially any electrical pre-distortion and electrical dispersion compensation for CSO (e.g., without an RF CSO correction and excluding optical correction). Pluggable optical transmitters 18 may create a plurality of optical signals spanning multiple wavelengths for transmission over a single optical fiber (e.g., span multiple wavelengths, and create a multiple wavelength set for transmission over a single fiber, DWDM or other sets for the cable space.)

In example embodiments, components of CMTS 12 may allow a platform operator to evaluate hardware operation and signal quality, including by software means. For example, in an instance of performance failure that is not detectable in an optical link outside headend 14, the platform operator may be able to methodically trace the signal performance back. In example embodiments, components of CMTS 12 may be configured to support legacy RF services via external analog or RF coax input, where external signals are combined inside CMTS 12 with internally generated signals (e.g., QAM, telemetry, reference test and out of band signals) so that both internally generated signals and external signals are present at the input to the optical transmitter. In example configurations, CMTS 12 may be configured to control and report a condition of pluggable optical transmitters 18. For example, monitoring and control modules may monitor and control laser source; module temperature; optical output power laser current; modulator bias voltage; hours of operation; date code; product description, etc.

In an example embodiment, CMTS 12 may be configured with an edge QAM (EQAM) modulator (e.g., components, circuitry, and/or modules providing EQAM modulation functionalities). The components, circuitry, and/or modules may operate and communicate through appropriate line cards, CPUs, wideband interface cards, etc. In embodiments according to the present disclosure, an output of the EQAM modulator is an input into pluggable optical transmitter 18. According to example embodiments, EQAM modulators in CMTS 12 may have multiple Gigabit Ethernet (GigE) data inputs (e.g., four GigE inputs, or 10 GigE inputs for carrier-class systems, etc.). EQAM modulators may be coupled to pluggable optical transmitters 18 for suitably providing QAM modulated RF signals thereto. In an example embodiment, EQAM modulators may be integrated into appropriate line cards within CMTS 12 to communicate with pluggable optical transmitters 18. In an alternate embodiment, EQAM modulators may be integrated with pluggable optical transmitters 18 and, further, may communicate with other components in CMTS 12 via suitable communication links.

Example embodiments of communication system 10 may be configured with an encompassing communication, control and network monitoring system that can control input/output functions for optics, EQAM functions, and CMTS including alarming, redundancy, hard alarms and soft alarms, manufacturing information, identification, hours of service, etc. In example embodiments, CMTS 12 may be configured with a single communication line for control and calibration of pluggable optical transmitters 18 within a chassis of CMTS 12. According to an example embodiment, an integrated automatic gain control function may be included, where an average output signal level is fed back to adjust the gain to an appropriate level for a range of input signal levels. For example, components such as an RF amplifier and VAR following a DAC can be used for the integrated automatic gain control function to create a desired/optimal RF input to pluggable optical transmitter 18.

Transition from mixed analog and QAM channel loadings to QAM only channel loading according to embodiments of the present disclosure may lead to low power consumption. Pluggable optical transmitters 18 may be configured to receive RF signals, convert them to optical signals and transmit the optical signals while consuming low power, (e.g., save between 5 to 12+ watts per port in DC power dissipation). Additional components in CMTS 12 may also be configured to facilitate low power consumption. For example, lower linearity and elimination of electronics may be used for CSO additive distortion correction. In addition, optical input power into optical receiver may be reduced, leading to lower launch powers and lower SBS circuitry. Multiple RF sources may collapse to one single RF output source into pluggable optical transmitters 18. Elimination of losses via combining equalizers may eliminate external RF management, including amplification. A target level of DRFI for example embodiments may be 15 dB, thereby reducing amplification stages that would be internal to CMTS 12, potentially leading to lower power consumption.

Figure 2:
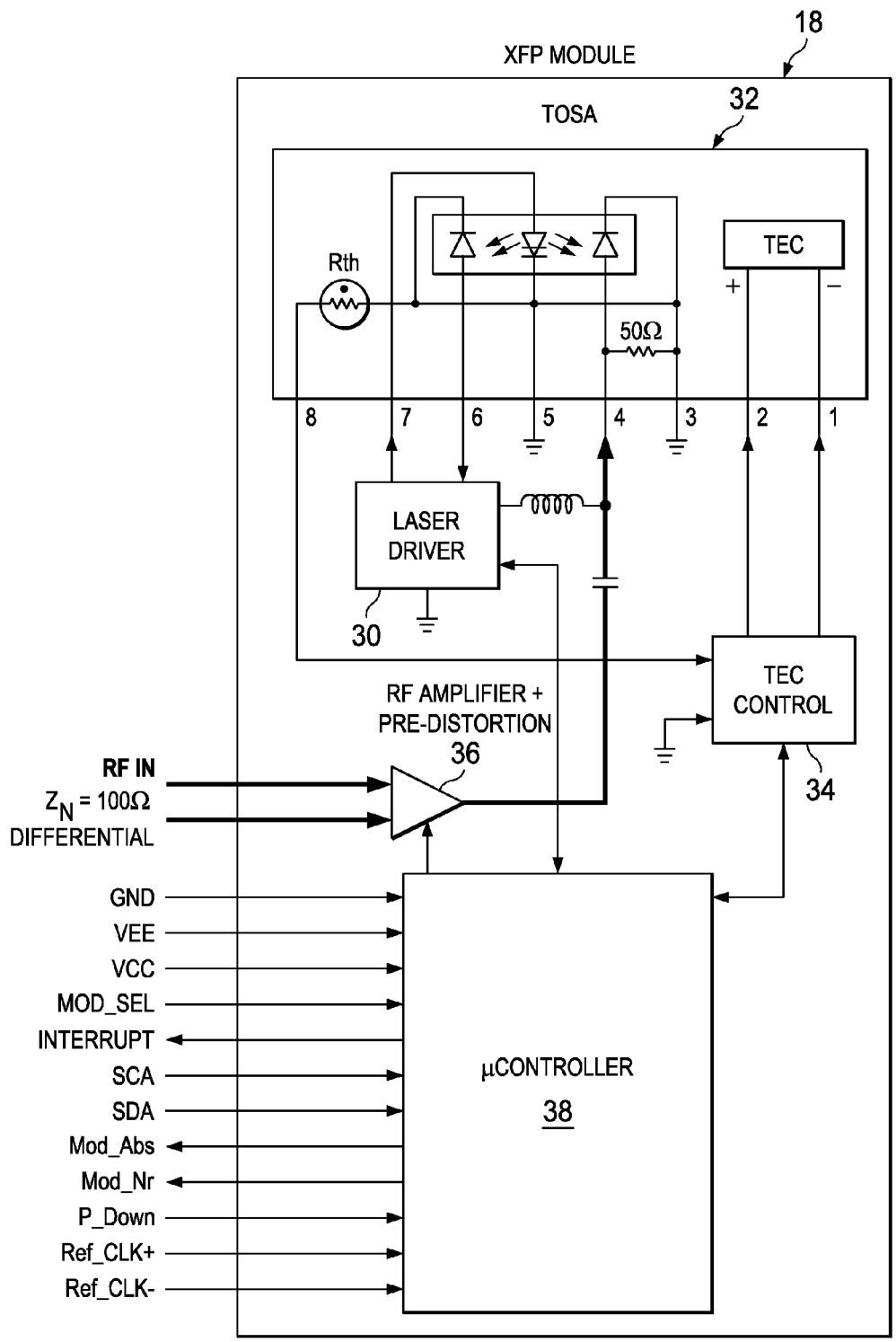
FIG. 2 is a simplified block diagram of additional details of the communication system in accordance with the present disclosure.

Turning to FIG. 2, FIG. 2 is a simplified block diagram of a pluggable optical transmitter in a small form factor XFP module according to embodiments of the present disclosure. Pluggable optical transmitter 18 may be configured into an XFP form factor to receive RF input from a host board (not shown) in CMTS 12 and to convert the data to an optical signal through a laser driver 30 that controls a laser diode in a Transmitter Optical Sub-Assembly (TOSA) 32. A thermoelectric cooling (TEC) control 34 may be connected to TOSA 32 to control the TEC module therein. A pre-distortion RF amplifier RF variable attenuator 36 may receive RF differential signals from the host board. A micro-controller 38 (including various pins for input/output as shown) may also be configured into pluggable optical transmitter 18 to control the various functions of the transmitter. Micro-controller 38 may include one or more processors and one or more memory elements for performing its controlling functions.

According to example embodiments of the present disclosure, a small form factor may be implemented for pluggable optical transmitter 18 using simplified technical requirements of CRM. QAM signaling may be referred to herein as complex RF modulation (CRM), where CRM is distinct from traditional analog video (e.g., National Television System Committee (NTSC), Phase Alternating Line (PAL), etc.), quasi-constant envelope digital signaling (Quadrature phase-shift keying (QPSK), offset QPSK (O-QPSK), etc.), baseband digital transmission techniques (e.g. optical carrier (OC)-192, 10 G, etc.) or combinations thereof. Simplification of CRM may be possible at least through two steps: (1) finding the smallest possible optical component packages that would be able to meet CRM linearity requirements; and (2) collapsing RF electronics into integrated circuitry. An all-CRM payload has no discrete, coherent inter-modulation products. CRM may be characterized by Carrier to Composite Noise (CCN), a measure of channel quality. CCN can account for channel noise ratio (CNR), non-coherent distortions (CIN) and crosstalk (CXR) according the following mathematical relation:

$$CCN^{-1}=CNR^{-1}+CIN^{-1}+CXR^{-1}$$

Optical links may not add significant phase jitter, enough to affect MER. Residual discrete products and phase jitter may prevent a linear CCN-MER relation. Nevertheless, in CRM links, MER can scale near-linearly with CCN, up to equipment limits.

Using electro-absorption (EA) laser transmitters may permit implementation of CRM to achieve small form factors. Such devices, referred to as Externally-Modulated Laser (EML) transmitters, typically include a CW laser integrated with Indium-Phosphide (InP) based EA modulator and optical functional blocks, monitoring and control features that may be similar to those found in existing digital XFPs, for example, Metro 10G XFP. The EML can operate linearly over a bias (IOP) range of 50-70 mA, yielding an optical output power of 4-6 dBm. If required, higher powers can be achieved by utilizing an erbium doped fiber amplifier (EDFA) shared across multiple output wavelengths. Other kinds of laser transmitters, such as directly modulated lasers, which permit implementation of CRM, may also be used.

In example embodiments, pre-distortion RF amplifier RF variable attenuator 36 may receive RF signals modulated according to 160 channel, 256-QAM techniques. In other example embodiments, the RF signals may be modulated according to 200 channel OFDM-QPSK. Various number of channels and QAM modulation (and/or other modulation) techniques may also be implemented based on appropriate needs and considerations. Pre-distortion RF amplifier RF variable attenuator 36 may route the RF signals to TOSA 32, where the EML transmitters converts the RF signals to optical signals and transmits the optical signals over the network.

Figure 3B:
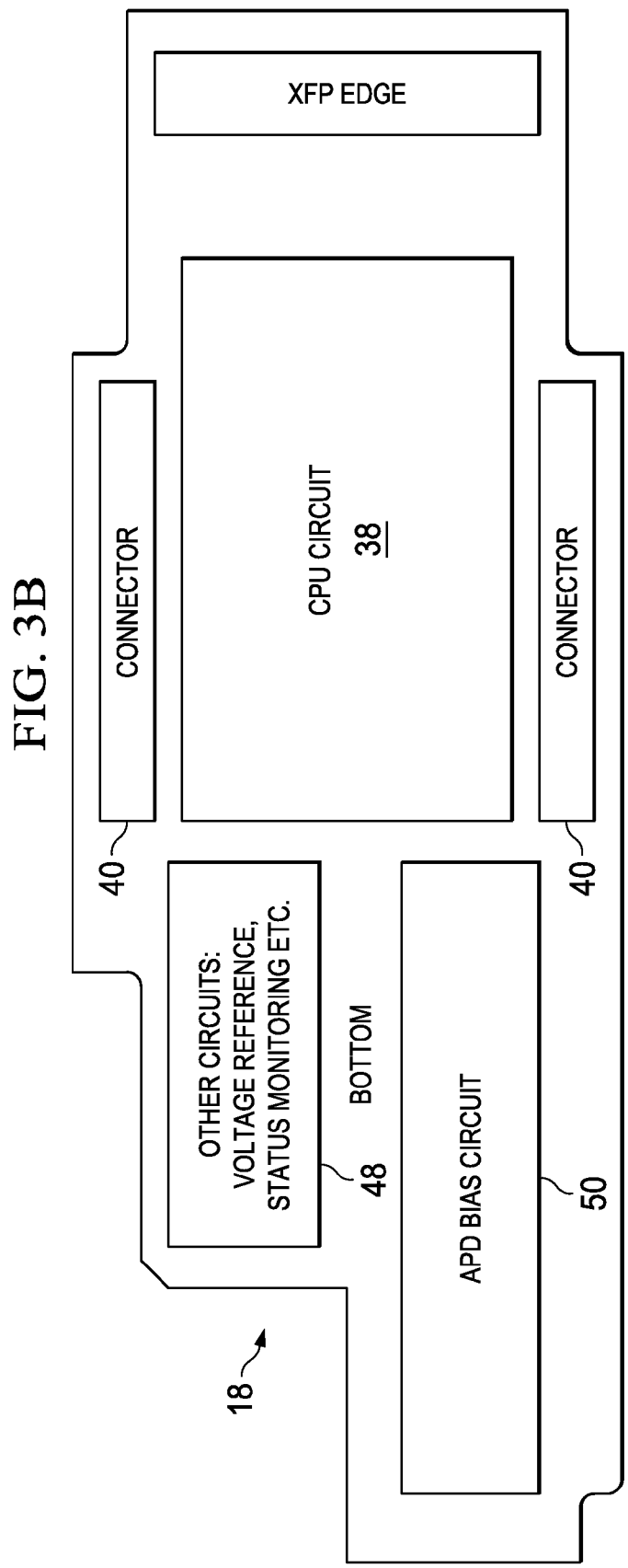
FIG. 3B is a simplified block diagram illustrating another view of the additional details of an example configuration of communication system in accordance with the present disclosure.

Turning to FIGS. 3A-3B, FIG. 3A is a simplified block diagram of an XFP motherboard showing the top and FIG. 3B is a simplified block diagram of the XFP motherboard showing the bottom according to embodiments of the present disclosure. According to an example configuration, pluggable optical transmitter 18 may be configured as a combination of motherboard and daughterboard, with specific circuits on each board. In an example embodiment, pre-distortion RF amplifier RF variable attenuator 36, connectors 40, receiver circuitry 42 including limiting amplifier, CDR impedance matching etc., receiver (Rx) connector 44, and transmitter (Tx) connector 46 may be located on a top surface of the motherboard. Located on a bottom surface of the motherboard may be other circuits 48 including voltage reference, status monitoring etc., avalanche photodiode (APD) bias circuit 50, central processing unit (CPU) circuit associated with microcontroller 38, and additional connectors 40.

In an example embodiment, pluggable optical transmitter 18 may be designed with a motherboard that is 1.75" long, and 0.6" wide, with additional dimensions as shown in FIGS. 3A and 3B. The particular shape and design of pluggable optical transmitter 18, including the motherboard dimensions, may be based on various design considerations including space limitations on CMTS 12, module-housing dimensions, location of pluggable optical transmitter 18 within CMTS 12, handling ease, manufacturing and tolerance considerations, etc. Various shapes and design possibilities exist apart from the particular example shown in FIGS. 3A and 3B.

Figure 4A:
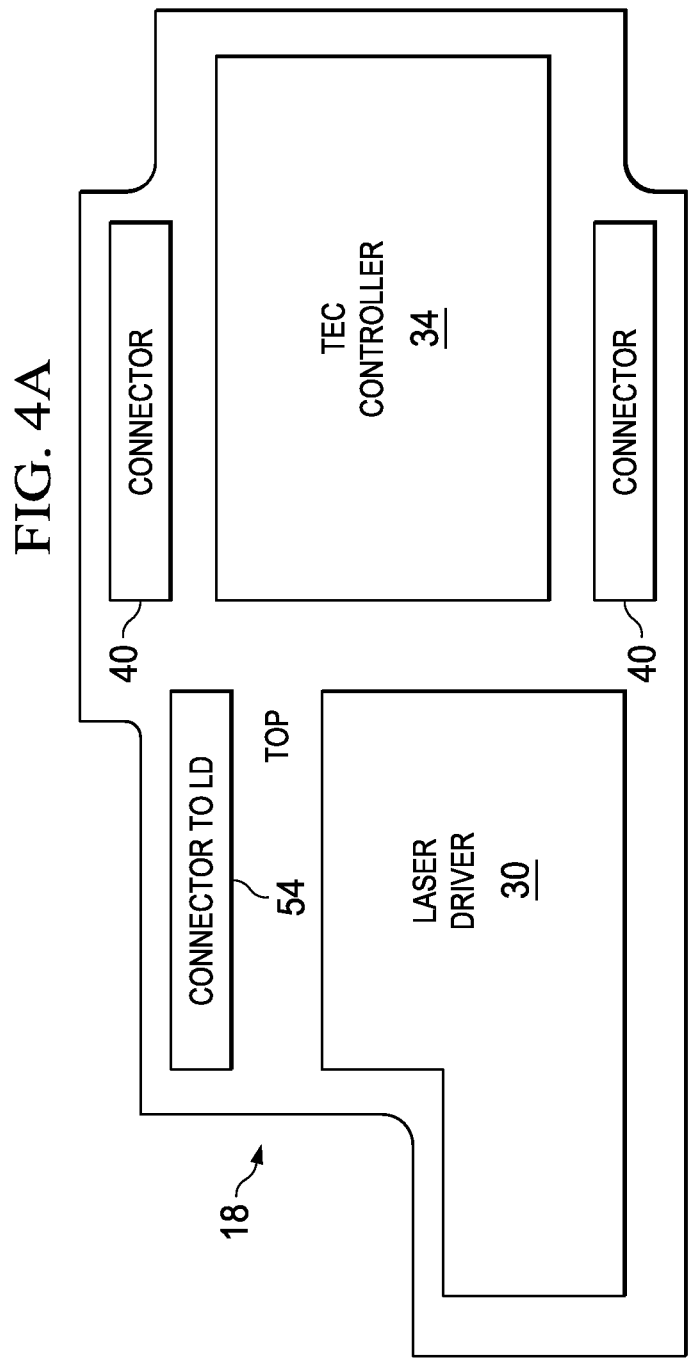
FIG. 4A is a simplified block diagram of further additional details of an example configuration of communication system in accordance with the present disclosure.

Turning to FIGS. 4A-4B, FIG. 4A is a simplified block diagram of an XFP daughterboard showing the top and FIG. 4B is a simplified block diagram of the XFP daughterboard showing the bottom according to embodiments of the present disclosure. In an example embodiment, TEC control 34, laser driver 30, connector 54 to laser driver 30 and additional connectors 40 may be located on a top surface of the daughterboard. Located on a bottom surface of the daughterboard may be circuit 52 including digital to analog converters (DACs) and other control circuits for TEC controller 34 and laser driver 30, and connectors 40.

In an example embodiment, pluggable optical transmitter 18 may be designed with a daughterboard that is 1.34" long, and 0.6" wide, with additional dimensions as shown in FIGS. 4A and 4B. The particular shape and design of pluggable optical transmitter 18, including the daughterboard dimensions, may be based on various design considerations including space limitations on CMTS 12, module-housing dimensions, location of pluggable optical transmitter 18 within CMTS 12, handling ease, manufacturing and tolerance considerations, etc. Various shapes and design possibilities exist apart from the particular example shown in FIGS. 4A and 4B.

Figure 5:
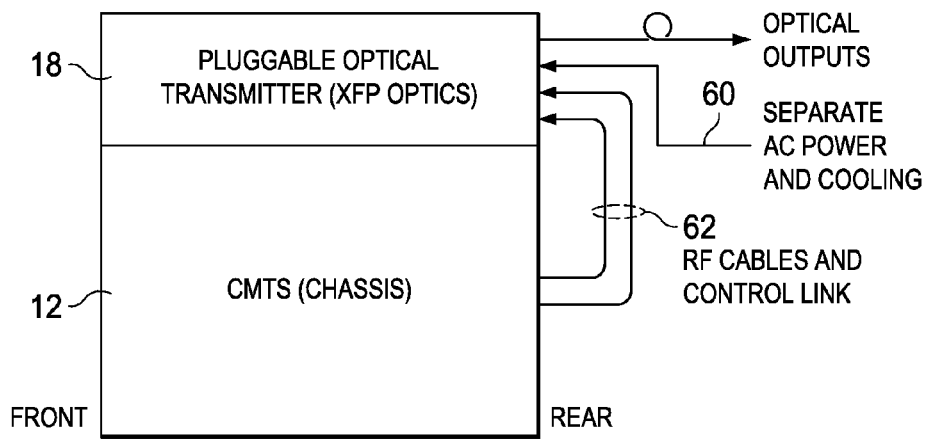
FIG. 5 is a simplified block diagram showing an example configuration associated with example embodiments.

Turning to FIG. 5, FIG. 5 is a simplified block diagram showing example placement options of certain components of communication system 10 according to embodiments of the present disclosure. Option 0 represents pluggable optical transmitter 18 mounted in an optional "snap-on" external rack unit (RU) chassis of CMTS 12. Separate power, and cooling cables 60, and optional RF control cables 62 may be provided to optical transmitter 18, for example, at a rear of the chassis of CMTS 12. The configuration may also support RF switch card or physical interface card (PIC) redundancy and optical redundancy. In general, an RF switch provides RF data path redundancy at both a line card level and an RF port level for bidirectional DOCSIS traffic up to 1.2 GHz. One or more pluggable optical transmitters 18 may be mounted on the CMTS 12 chassis, for example, in a horizontal configuration (e.g., side by side).

Figure 6:
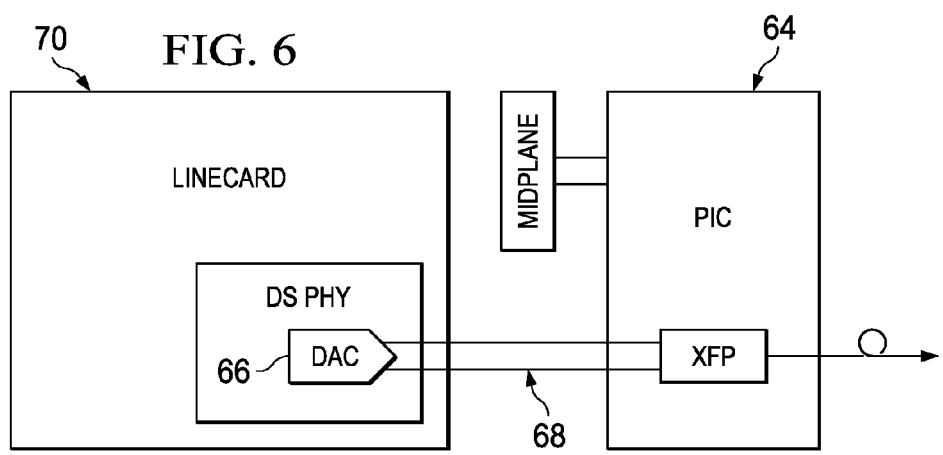
FIG. 6 is a simplified block diagram showing another example configuration associated with example embodiments.

Turning to FIG. 6, FIG. 6 represents pluggable optical transmitter 18 mounted on a PIC 64, with direct differential connection to up-convertor (Upx) DAC 66 using a differential redundancy daisy chain 68. In example embodiments, PIC 64 may be an RF switch card. DAC 66 may be located in line card 70. Line card 70 may comprise a direct sequence physical layer (DS PHY) including a QAM modulator and up-converter and may be located in a host board of CMTS 12. In the example configuration, RF performance may be poor due to low-level signal input extended across the cards (e.g., line card 70 and PIC 64). Differential connection 68 may be implemented from line card 70 to PIC 64. The example configuration shown in FIG. 6 may use a balun (a type of electrical transformer that can convert electrical signals that are balanced about ground (e.g., differential) to signals that are unbalanced (e.g., single-ended), and the reverse) on PIC 64 for RF output mode, doubling the number of connections between line card 70 and PIC 64.

Figure 7:
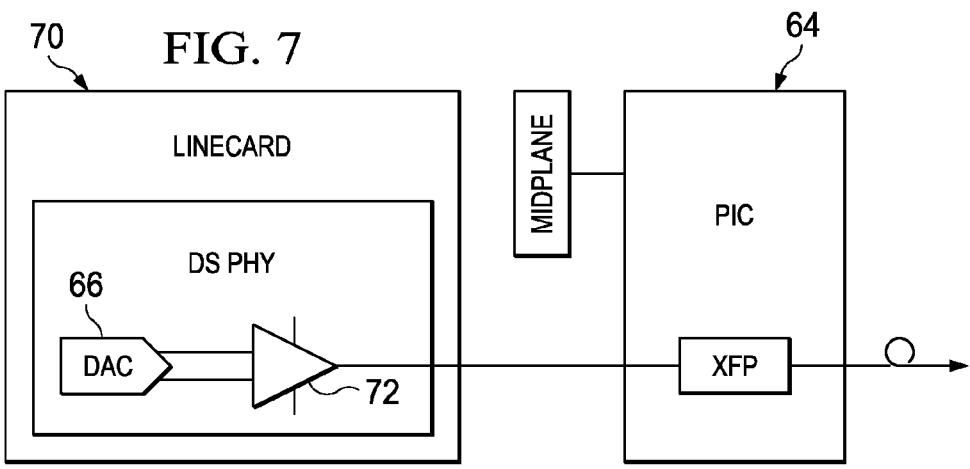
FIG. 7 is a simplified block diagram showing yet another example configuration associated with example embodiments.

Turning to FIG. 7, FIG. 7 represents pluggable optical transmitter 18 mounted on PIC 64, with single-ended connection to Upx buffer amplifier 72 at a reduced level. RF performance may be poor compared to optics-on-line card, and power draw may also be high. The configuration may not include space for return path optics, and DS PHY may consume one or more PICs. The configuration illustrated in FIG. 7 may use custom-designed up-converter/amplifier ("Upx amps") to moderate power dissipation. RF redundancy can be supported with high-power version of a protect line card (e.g., an additional line card). Optical switching may be optional.

In another example embodiment, pluggable optical transmitter 18 may be mounted on PIC 64, with single-ended connection (at a reduced level) to Upx DAC 66 via a balun (instead of a buffer amplifier). The example configuration may use custom-designed Upx amps to moderate power dissipation and may not have sufficient carrier-to-noise ratio (CNR). In yet another example embodiment, pluggable optical transmitter 18 may be mounted on PIC 64, with single-ended connection to Upx power amplifier (PA) with standard power. The configuration may support RF redundancy, but may consume high power. In yet another example embodiment, pluggable optical transmitter 18 may be mounted on PIC 64 with single-ended connection to Upx PA with programmable PA direct current (DC) power. The configuration may have poor RF performance compared to optics on line card, use a PA design that supports programmable DC power, and may call for custom-designed Upx amps to moderate power dissipation.

Figure 8:
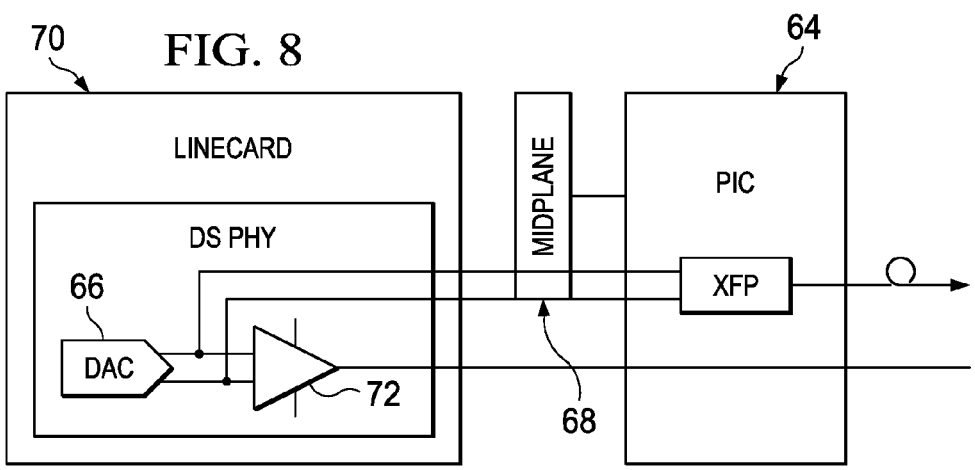
FIG. 8 is a simplified block diagram showing yet another example configuration associated with example embodiments.

Turning to FIG. 8, FIG. 8 represents pluggable optical transmitter 18 mounted on PIC 64, with separate differential connection 68 to Upx DAC 66. The example configuration may have poor RF performance and noise ingress due to both single ended and differential connectivity. RF may be somewhat DRFI compliant. The configuration may support optical switching. Turning to FIG. 9, FIG. 9 represents pluggable optical transmitter 18 mounted on line card 70, with a 'blind mate' connection 74 (e.g., on back of line card 70). In the example configuration shown, optical switching may be supported. The configuration may have excellent power and RF performance, without impact on a front of line card 70.

Turning to FIG. 10, FIG. 10 represents pluggable optical transmitter 18 mounted on a front of line card 70, with optical jumper cables 76 connecting from the front to the rear. The configuration may not be PRD compliant. Removing line card 70 may entail disconnecting the optical jumper cables. The configuration may use optical switches 78. It should be appreciated that various other configurations and placements for pluggable optical transmitters 18 may be possible without departing from the scope of the present disclosure. In example embodiments, PIC 64 may support XFP pluggable optics or smaller form factor and interface standards.

Figure 11:
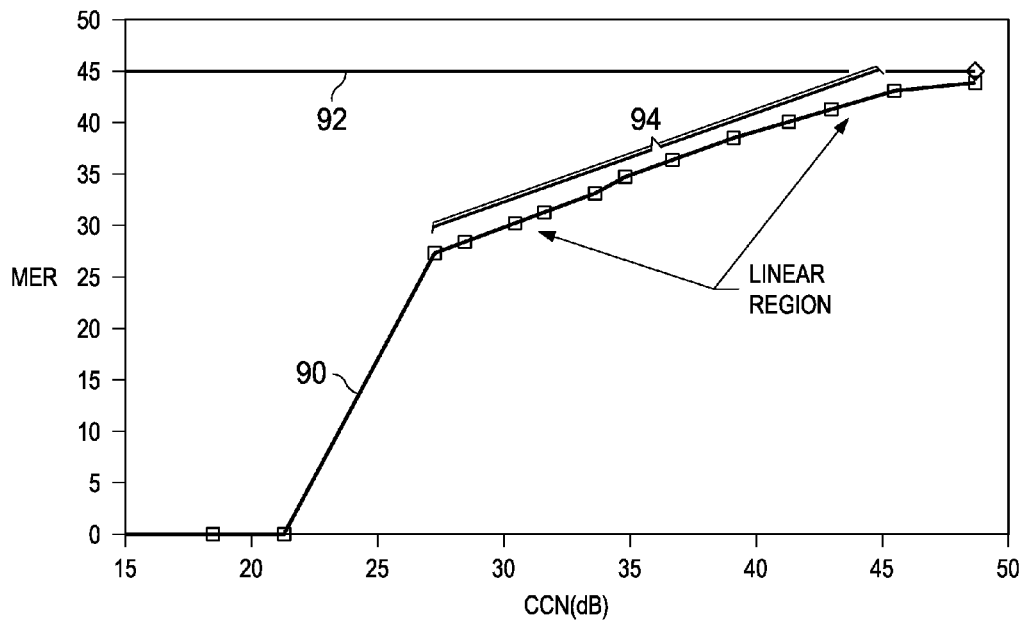
FIG. 11 is a graph showing modulation error ratio as a function of carrier-to-composite noise.

Turning to FIG. 11, FIG. 11 is a graph showing modulation error ratio (MER) to carrier-to-composite noise (CCN) according to example embodiments of the present disclosure. CCN is plotted along the X-axis in decibels (dB) and MER is plotted along the Y-axis in dB. MER can represent the difference between average symbol amplitude and average error for the symbol. To achieve maximum bandwidth efficiency in the physical transport layer, high-order (e.g., 64 through 1024) QAM transport may be used.

Table 1 herein details performance parameters expected for a current access optical link, as measured at an HFC node. It compares performance for a mixed modulation loading of 75 AM-VSB channels with 75 channels of 256-QAM (representing an existing case for many access networks) to a load consisting of 160 channels of all 256-QAM.

TABLE 1

| Performance Parameter | Existing (Analog/QAM) 78 Analog Carriers 75 Carriers, 256-QAM | CRM 160 Carriers of all 256-QAM |
| --- | --- | --- |
| Carrier-to-noise ratio (CNR) (dBc) | >50 | >40 |
| Composite Second Order (CSO) (dBc) | <63 | <55 |
| Composite Triple Beat (CTB) (dBc) | <63 | <55 |
| Modulation Error Ratio (MER) (dB) | >37 | >37 |
| Bit Error Rate (BER), Pre-FEC | $<10^{-9}$ | $<10^{-9}$ |
| Bit Error Rate (BER), Post-FEC | $<10^{-12}$ | $<10^{-12}$ |

To measure "analog" parameters such as CNR, CSO, and CTB for a 160-channel 256-QAM CRM load, all QAM modulators used during measurement may be set to continuous wave (CW) operation. Further, such CW level may be calibrated at a level corresponding to modulated carriers yielding a minimum 37 dB equalized modulation error ratio (MER) for the 160 channel QAM load to differentiate among linear and nonlinear impairment mechanisms that result in a noise component of the MER. For example, analog measurements are used to give a more detailed description of the mechanisms responsible for impairing (or limiting) the QAM MER values of an access link. However, it may be noted that any inclusion of analog channels may have a negative effect of producing discrete clusters of distortions, which can peak within the bandwidth of a QAM channel, degrading overall performance. CNR and CCN may not reveal the degradation that occurs from the presence of analog distortion products affecting MER.

Analog parameters are necessary, but not sufficient, to yield robust MER values because analog parameters do not fully account for effects of phase noise or "quasi-phase noise" like effects. Thus, there exist instances in which phase noise components may determine QAM MER performance, for example in the case of high CCN and CNR values. Such cases may occur, for example, in mixed analog/QAM links when large (e.g., >−40 dBc) analog distortion products fall near or under a QAM carrier and are resolved by the customer premises equipment's (CPE's) demodulator as non-coherent single frequency components. This quasi-phase noise degrades modulation recovery, thus reducing MER. This impairment is specific to mixed analog-QAM transmission, due to the high-energy analog carriers producing discrete distortion products. Such effects may not exist in all-QAM CRM transmission. Any residual phase and delay impairments beyond the access optical link, due to RF impedance mismatches for example, are adequately compensated for by the QAM receiver's adaptive equalizer.

Moreover, optics may be approximately linear for amplitude and phase transmission, implying that there may be no clipping and no compression in transmission leading to avoidance of excessive, variable timing delays (e.g., on the order of multiple milliseconds). In the case of clipping and distortion, such issues can be routinely dealt with in proper optical transmitter design and calibration. Redundant link delays can be accommodated by approximately matched delays in a redundant link layout. Well-designed optical link delays may be limited by dispersion (e.g., a sub-nanosecond phenomenon), which does not contribute significant phase noise to QAM signals at access optics link lengths (e.g., sub-100 km).

In addition to hardware and link considerations, nonlinear components generated may affect performance of CRM signals over HFC access optical links. In mixed analog and QAM access transport links, impairments can consist of noise, discrete distortion products due to nonlinearities such as CSO and CTB, and optical RF crosstalk and beating effects. Such discrete distortion products can lead to tones lying near or under QAM carriers, which result in degraded MER, while still exhibiting low noise and excellent CNR. In contrast, a CRM payload's nonlinear impairments can manifest themselves as Gaussian noise-like components. For example, second and third order products may be noise-like rather than clusters of composite beats, and can be considered additions to the noise floor under a QAM carrier. Further, this principle can also extend to multi-wavelength crosstalk components such as optical cross-phase modulation (XPM) and four-wave mixing (FWM).

Thus, CRM loading offers a new set of choices for a network designer due to a more forgiving nature of distortion impairments appearing as Gaussian noise-like components. End-to-end IP functionality can benefit from an increase in bandwidth efficiency of high order, all-QAM CRM transmission, and relaxed transmission requirements compared to requirements of mixed analog/QAM channel loads, shown in Table 1. IP video transport may take advantage of CRM loading, which may not suffer from out-of-band discrete distortion beats created by analog channels and that are exacerbated as drive levels reach non-linear peaking or compression. In mixed loads, the beat clusters falling near or in QAM channels stress decision boundaries and may be problematic for demodulation routines to withstand and correct.

The Gaussian noise-like nature of distortion products generated in an all-QAM access link can allow the CCN of a CRM loading to be near-linearly related to the MER, as shown in FIG. 11. MER 90 may be compared against analyzer baseline 92. As shown in FIG. 11, CCN and equalized MER are seen to have a linear relationship 94 within an operating range of a Rhode & Schwarz EFA QAM signal analyzer. CCN varies linearly from approximately 28 dB CCN lower analyzer acquisition locking limit (e.g., for 256-QAM), to a 42 dB CCN upper limit, due to the analyzer's 46 dB maximum MER measurement capability.

A linear relationship between CCN and MER may lead to at least the following two advantages of an end-to-end IP access network based upon all-QAM, CRM transmission: (1) linearity useful for unimpaired optical transmission may be decreased in CRM network payloads, specifically (i) relaxing CSO and CTB for both optical and RF domains, and (ii) relaxing XPM and FWM requirements in the optical domain; and (2) linear relationship between CNR, CSO, CTB with optical cross-talk (XPM and FWM), and MER may allow the same design approaches traditionally used to make hardware decisions for access hardware links, with the advantage of relaxed noise and distortion goals.

In example embodiments, CNR may be reduced by nearly 10 dB, with CSO and CTB reduced by 8 dB, potentially opening a number of possibilities for new links and radically different RF transmitter designs, and simplifying the design, manufacturing and tuning challenges for CRM optical transmitters over those of their mixed-payload analog predecessors. Pluggable optical transmitters 18 may reduce optical transmitter size and power dissipation while tightening integration within the headend or hub's content-generation hardware. These reductions reduce shelf space and power dissipation, while improving ease of use. Moreover, despite being end-to-end digital, with DOCSIS data and IP video delivery traffic, networks utilizing 256-QAM designs (and/or 64-QAM, 1024-QAM, etc. as appropriate) can target specific CNR, CSO, and CTB goals, with the expectation of well-defined QAM MER performance.

In example embodiments, two or three service tones spread throughout the operating bandwidth may be added without degrading the CRM signal. Thus, CRM payloads can allow simplified, straightforward design rules for access links, which can be exploited to improve access transmitters for end-to-end IP video delivery. CRM can also increase link budget, depending upon link parameters such as equivalent Optical Modulation Index (OMI) per CW channel and a desired RF output at the node. Switching to CRM can result in approximately 3 dB reduction in optical input power to the node receiver.

In example embodiments, where QAM loading exhibits a high CCN, the receiver input can be reduced to a point where the shot and thermal noise components of the receiver dominate at this lower input power. Such a link budget improvement can be used to lower launch power and so lower the non-linear dynamics occurring in the fiber. Since fiber non-linearities can be launch-power dependent, even a 2 dB launch power reduction can yield a significant reduction in crosstalk and four-wave mixing. In embodiments, where a cable operator may have some leeway in accounting for RF power, for example, via unused amplification potential or node segmentation throughout the RF chain to the home, the optical input power into the receiver can be reduced by more than 3 dB, down to −10 dBm or lower, depending on several performance factors. Higher optical link budgets can also reduce SBS suppression, which can be a challenge for cable optical transmitters (e.g., special circuitry may be designed to compensate for SBS in existing cable optical transmitters).

An advantage of reduced linearity requirements for all-QAM channel loads is creation of a potential tangible shift from hardware employed to make legacy cable optical transmitters, to making future IP ready transmitters. In particular, there may be new opportunities in the mix of components that can be used to reach desired performance values, in addition to reduced size and power consumption.

Figure 12:
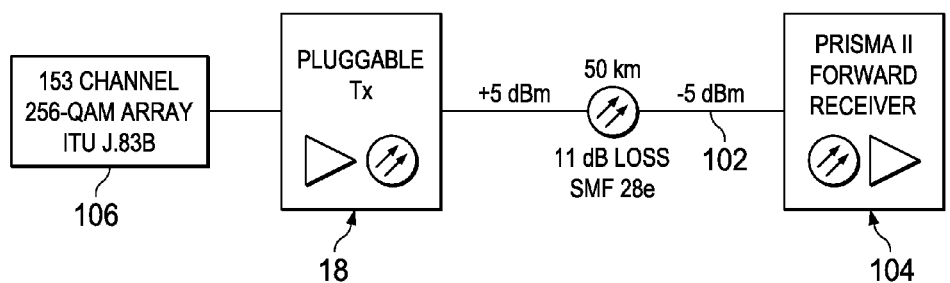
FIG. 12 is a simplified block diagram of an example embodiment of the present disclosure.

Turning to FIG. 12, FIG. 12 is a simplified schematic diagram of an example embodiment of the present disclosure. FIG. 12 illustrates a simplified representation of an example test case for pluggable optical transmitter 18, whose optical package and pertinent RF electronics can fit in a 10 Gigabit small form factor pluggable XFP package. Pluggable optical transmitter 18 may be configured with an output of 5 dBm followed by 35 km of fiber 102 (e.g., Corning SMF 28e) into a forward receiver 104 (e.g., Prisma II) with an input power of −3 dBm. The input channel loading can be 153, 256-QAM, ITU-T J.83 Annex B channels in a 153 channel 256 QAM array 106. In the test configuration used, the channel loading spanned 82 MHz to 1 GHz, leaving room for expected growth in the return path.

Turning to FIG. 13, FIG. 13 shows equalized MER performance of an example embodiment according to the present disclosure. Results from an example test case are being described with reference to FIG. 12. Radio frequency is plotted along the X-axis in MHz and equalized MER is plotted along the Y-axis in dB. MER 110 increases to approximately 38 dB at 250 MHz and decreases to approximately 36 dB at 1 GHz, with an average value of approximately 37 dB, which is in the desired range for CATV communication.

Turning to FIG. 14, FIG. 14 is a simplified flowchart showing example operational steps that may be associated with embodiments of the present disclosure. A flow 120 begins in 122 when pluggable optical transmitter 18 is activated. In 124, pluggable optical transmitter 18 receives full spectrum modulated RF signals (e.g., 160 channel, 256-QAM) from CMTS 12. In 126, pre-distortion RF amplifier RF variable attenuator 36 may route the RF signals to an EML transmitter in TOSA 32. In 128, TOSA 32 (e.g., through the EML transmitter) converts RF signals to optical signals and transmits the optical signals in 130. The process ends in 132.

Figure 15:
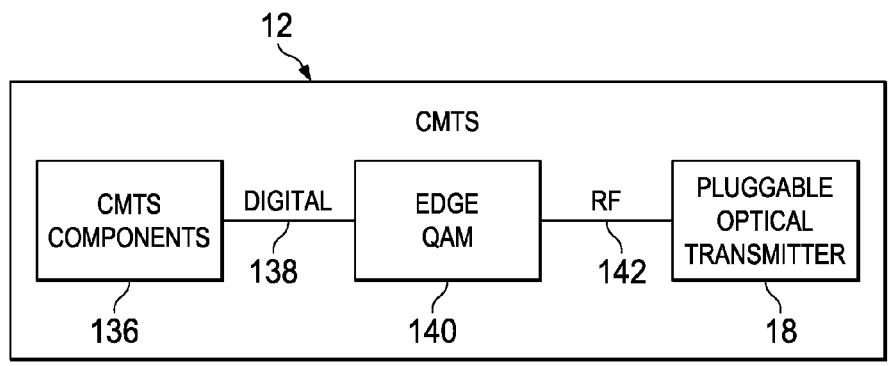
FIG. 15 is a simplified block diagram of an example configuration of an embodiment of the present disclosure.

Turning to FIG. 15, FIG. 15 is a simplified block diagram showing example configurations associated with embodiments of the present disclosure. CMTS 12 may include CMTS components 136 connected through a digital link 138 to an EQAM modulator 140. EQAM modulator 140 may convert digital signals to RF signals. EQAM modulator 140 may be connected to pluggable optical transmitter 18 through an RF link 142. CMTS components 136, EQAM modulator 140 and pluggable optical transmitter 18, and all appropriate communication links (e.g., digital link 138 and RF link 142) may be integrated and located within a chassis of CMTS 12.

Figure 16:
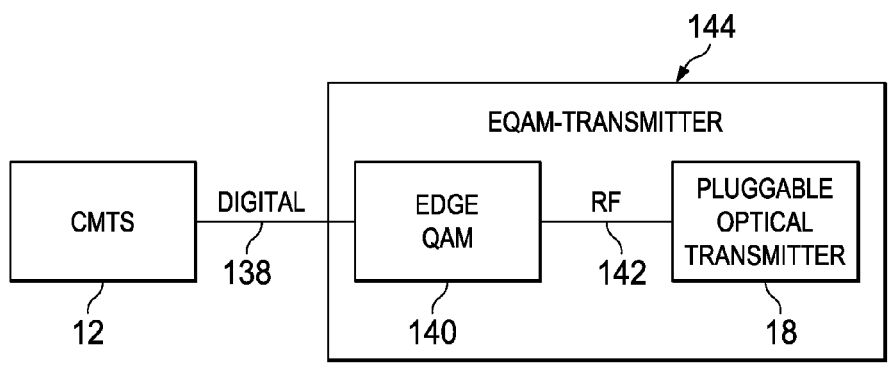
FIG. 16 is a simplified block diagram of another example configuration of an embodiment of the present disclosure.

Turning to FIG. 16, FIG. 16 is a simplified block diagram showing example configurations associated with embodiments of the present disclosure. Pluggable optical transmitter 18 may be connected to EQAM modulator 140 connected through RF link 142. Pluggable optical transmitter 18 and EQAM modulator 140 may be integrated into an EQAM-Transmitter 144, which may be connected by digital link 138 to CMTS 12. In an example embodiment, EQAM-Transmitter 144 is integrated into a line card inside a chassis of CMTS 12, but may be configured to be removed if needed (e.g., for repairs). In an alternative embodiment, EQAM-Transmitter 144 is configured as a separate box in communication with CMTS 12.

In example implementations, at least some portions of the activities related to facilitating fiber access transport using pluggable RF optics outlined herein may be implemented in software in, for example, pluggable optical transmitter 18 and CMTS 12. In some embodiments, one or more of these features may be implemented in hardware, provided external to these elements, or consolidated in any appropriate manner to achieve the intended functionality. Pluggable optical transmitter 18 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, pluggable optical transmitter 18 described and shown herein may also include suitable interfaces for receiving, transmitting, and/or otherwise communicating data or information in a network environment. Additionally, some of the processors and memory elements associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements in microcontroller 38) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, one or more processors associated with microcontroller 38 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components in communication system 10 can include one or more memory elements (e.g., memory elements in microcontroller 38) for storing information to be used in achieving operations associated with facilitating fiber access transport using pluggable RF optics as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that communication system 10 of the FIGURES and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Moreover, it is imperative to note that all of the specifications and relationships outlined herein (e.g., height, width, length, etc.) have only been offered for purposes of example and teaching only. Each of these data may be varied considerably without departing from the spirit of the present disclosure, and the scope of the appended claims. The specifications apply only to specific, non-limiting examples and, accordingly, should be construed as such. In specific implementations, any suitable length, width, and depth (or height) may be used and, further, can be based on particular configurations, architectures, signaling, end user needs, or specific elements to be addressed by communication system 10.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols in which packets are exchanged in order to provide mobility data, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving radio frequency (RF) signals from a cable modem termination system (CMTS) in a small form factor pluggable optical transmitter;
   converting the RF signals to optical signals in the small form factor pluggable optical transmitter, wherein a modulation error ratio (MER) of the RF signal varies in a substantially linear fashion with Carrier to Composite Noise (CCN); and
   transmitting, by the small form factor pluggable optical transmitter, the optical signals on a network.

2. The method of claim 1, wherein the pluggable optical transmitter is provisioned in a chassis of the CMTS.

3. The method of claim 1, wherein the RF signals are modulated.

4. The method of claim 1, wherein the converting is facilitated by a laser transmitter, the laser transmitter being a selected one of an externally modulated laser (EML) transmitter and a directly modulated laser transmitter.

5. The method of claim 1, wherein the RF signals are received by a pre-distortion RF amplifier RF variable attenuator.

6. The method of claim 1, wherein the small form factor pluggable optical transmitter is compliant to an XFP form factor comprising height, width, and depth dimensions of substantially 0.33 inches, 0.72 inches, 3.1 inches, respectively.

7. The method of claim 1, wherein the small form factor pluggable optical transmitter is compliant to an SFP form factor comprising height, width, and depth dimensions of substantially 0.33 inches, 0.53 inches, and 2.22 inches, respectively.

8. The method of claim 1, wherein direct current power consumption savings attributable to activities associated with the small form factor pluggable optical transmitter are in a range from 5 W to 16 W when compared with a content generation device that does not use the small form factor pluggable optical transmitter.

9. An apparatus, comprising:
   a pre-distortion radio frequency (RF) amplifier RF variable attenuator;
   a memory element configured to store data;
   an optical transmitter; and
   a processor operable to execute instructions associated with the data, wherein the pre-distortion RF amplifier RF variable attenuator, the optical transmitter, the computing processor, and the memory element are provisioned in a small form factor pluggable optical transmitter, wherein a single communication line is provisioned for control and calibration of the small form factor pluggable optical transmitter.

10. The apparatus of claim 9, further comprising: an edge QAM modulator.

11. The apparatus of claim 9, wherein the apparatus is configured for:
    receiving RF signals;
    converting the RF signals to optical signals; and
    transmitting the optical signals on a network.

12. The apparatus of claim 9, wherein the RF signals are modulated.

13. The apparatus of claim 9, wherein an automatic gain control of the RF signals is performed.

14. The apparatus of claim 9, wherein the apparatus is a cable modem termination system (CMTS).

15. The apparatus of claim 14, wherein the single communication line is provisioned within a chassis of the CMTS.

16. The apparatus of claim 9, wherein the small form factor pluggable optical transmitter is compliant to an XFP form factor comprising height, width, and depth dimensions of substantially 0.33 inches, 0.72 inches, 3.1 inches, respectively.

17. The apparatus of claim 9, wherein the small form factor pluggable optical transmitter is compliant to an SFP form factor comprising height, width, and depth dimensions of substantially 0.33 inches, 0.53 inches, and 2.22 inches, respectively.

18. The apparatus of claim 9, further comprising:
a plurality of small form factor pluggable optical transmitters configured to provide direct current power consumption savings in a range from 5 W to 16 W for each of the small form factor pluggable optical transmitters, when compared with a content generation device that does not use the small form factor pluggable optical transmitters.

19. The apparatus of claim 9, wherein the small form factor pluggable optical transmitter generates a plurality of optical signals spanning multiple wavelengths for transmission over a single optical fiber.

20. The apparatus of claim 9, wherein the optical transmitter is a laser transmitter that is a selected one of an externally modulated laser (EML) transmitter and a directly modulated laser transmitter.

21. The apparatus of claim 9, wherein the small form factor pluggable optical transmitter is coupled to a content generation device.

22. The apparatus of claim 9, wherein the small form factor pluggable optical transmitter is mounted on a physical interface card (PIC) with a differential connection to an up-convertor digital to analog convertor located in a line card within the apparatus.

23. The apparatus of claim 9, wherein the small form factor pluggable optical transmitter is mounted on a PIC, with a single-ended connection to a buffer amplifier.

24. The apparatus of claim 9, wherein the small form factor pluggable optical transmitter is mounted on a rear of a line card through a blind mate connection.

25. The apparatus of claim 9, wherein the small form factor pluggable optical transmitter is mounted on a front of a line card with optical jumper cables connecting from the front of the line card to a rear of the line card.

26. Logic encoded in non-transitory media that includes code for execution and when executed by a processor is operable to perform operations in a small form factor pluggable optical transmitter, comprising:
receiving radio frequency (RF) signals from a cable modem termination system (CMTS);
converting the RF signals to optical signals, wherein a MER of the RF signal varies in a substantially linear fashion with CCN; and
transmitting the optical signals on a network.

27. The logic of claim 26, wherein the RF signals are modulated.

28. The logic of claim 26, wherein the small form factor pluggable optical transmitter is compliant to an XFP form factor comprising height, width, and depth dimensions of substantially 0.33 inches, 0.72 inches, 3.1 inches, respectively.

29. The logic of claim 26, wherein the small form factor pluggable optical transmitter is compliant to an SFP form factor comprising height, width, and depth dimensions of substantially 0.33 inches, 0.53 inches, and 2.22 inches, respectively.

* * * * *